United States Patent
Wang (10) Patent No.: US 10,402,058 B2
(45) Date of Patent: Sep. 3, 2019

(54) MESSAGE DISPLAY METHOD AND TERMINAL DEVICE

(71) Applicant: TENCENT TECHNOLOGY (SHENZHEN) COMPANY LIMITED, Shenzhen (CN)

(72) Inventor: Qianyi Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 29 days.

(21) Appl. No.: 15/728,117

(22) Filed: Oct. 9, 2017

(65) Prior Publication Data

US 2018/0032222 A1 Feb. 1, 2018

Related U.S. Application Data

(63) Continuation of application No. PCT/CN2016/098398, filed on Sep. 8, 2016.

(30) Foreign Application Priority Data

Dec. 7, 2015 (CN) .......................... 2015 1 0894019

(51) Int. Cl.
G06F 3/0483 (2013.01)
H04L 12/58 (2006.01)
G06F 16/00 (2019.01)

(52) U.S. Cl.
CPC ............ *G06F 3/0483* (2013.01); *G06F 16/00* (2019.01); *H04L 51/32* (2013.01)

(58) Field of Classification Search
CPC ................................ G06F 17/30; G06F 3/0483
See application file for complete search history.

(56) References Cited

U.S. PATENT DOCUMENTS

2010/0192081 A1 7/2010 Inoue et al.
2011/0219083 A1* 9/2011 Nishi ...................... G06F 15/16
709/206

(Continued)

FOREIGN PATENT DOCUMENTS

CN 101083687 A 12/2007
CN 102932454 A 2/2013
CN 103001850 A 3/2013

OTHER PUBLICATIONS

The World Intellectual Property Organization (WIPO) International Search Report for PCT/CN2016/098398 dated Nov. 28, 2016 6 Pages (including translation).

*Primary Examiner* — Li P Sun
(74) *Attorney, Agent, or Firm* — Anova Law Group, PLLC (57) ABSTRACT

The present disclosure provides a message display method and a terminal device. The terminal device obtains message sources published on a social platform; classifies the message sources into read messages and unread messages according to states of the message sources; provides a user interface associated with the social platform, the user interface including a first tab and a second tab for indicating the states of the message sources; respectively associates the unread messages with the first tab, and the read messages with the second tab; receives a message source refresh request from the user interface; and in response to the message source refresh request, displays the unread messages under the first tab of the user interface.

12 Claims, 6 Drawing Sheets

(56) References Cited

U.S. PATENT DOCUMENTS

2014/0359031 A1* 12/2014 Maruyama .............. H04L 51/34
  709/206
2015/0220219 A1* 8/2015 Wetherell ............ G06F 17/3089
  715/716
2016/0248853 A1* 8/2016 Chiu ....................... H04L 51/24

* cited by examiner

MESSAGE DISPLAY METHOD AND TERMINAL DEVICE

CROSS-REFERENCES TO RELATED APPLICATIONS

This application is a continuation application of PCT Patent Application No. PCT/CN2016/098398, filed on Sep. 8, 2016, which claims priority to Chinese Patent Application No. 201510894019.X, filed with the Chinese Patent Office on Dec. 7, 2015 and entitled "MESSAGE DISPLAY METHOD AND TERMINAL DEVICE", which is incorporated herein by reference in its entirety.

FIELD OF THE TECHNOLOGY

The present disclosure relates to the field of communication technologies, and in particular, to a message display method and a terminal device.

BACKGROUND OF THE DISCLOSURE

Message source of an existing social platform are usually displayed in sequence according to a time order. When a user refreshes the message sources of the social platform, displayed content may be viewed by the user within a period. As a result, the user receives repeated message sources. Consequently, user experience is degraded.

The foregoing content is only used for helping understand the technical solutions of this application, and the foregoing content is not intended to be admitted as the existing technology.

SUMMARY

An embodiment of this application provides a message display method, the message display method including: obtaining message sources published on a social platform; classifying the message sources into read messages and unread messages according to states of the message sources; providing a user interface associated with the social platform, the user interface including a first tab and a second tab for indicating the states of the message sources; respectively associating the unread messages with the first tab, and the read messages with the second tab; and receiving a message source refresh request from the user interface; in response to the message source refresh request, displaying the unread messages under the first tab of the user interface.

An embodiment of this application further provides a terminal device, the terminal device including a processor and a memory, the memory storing an instruction executable by the processor, and the processor is configured for: obtaining message sources published on a social platform; classifying the message sources into read messages and unread messages according to states of the message sources; providing a user interface associated with the social platform, the user interface including a first tab and a second tab for indicating the states of the message sources; respectively associating the unread messages with the first tab, and the read messages with the second tab; and receiving a message source refresh request from the user interface; in response to the message source refresh request, displaying the unread messages under the first tab of the user interface.

An embodiment of this application provides a non-transitory computer-readable medium containing computer-executable program for, when being executed by a processor, implementing a message display method, the message display method including: obtaining message sources published on a social platform; classifying the message sources into read messages and unread messages according to states of the message sources; providing a user interface associated with the social platform, the user interface including a first tab and a second tab for indicating the states of the message sources; respectively associating the unread messages with the first tab, and the read messages with the second tab; and receiving a message source refresh request from the user interface; in response to the message source refresh request, displaying the unread messages under the first tab of the user interface.

The objective implementation, functional features and advantages of this application are further illustrated with reference to the accompanying drawings by using the embodiments.

DESCRIPTION OF EMBODIMENTS

It should be understood that the specific embodiments described herein are only used to explain this application, rather than to limit this application.

In an implementation solution, a terminal device involved in this application may be a mobile phone terminal, or may be various mobile terminals such as a PC terminal, a tablet computer, and a portable electronic device. In the embodiments of this application, a mobile phone the terminal is used as an example.

Figure 1:
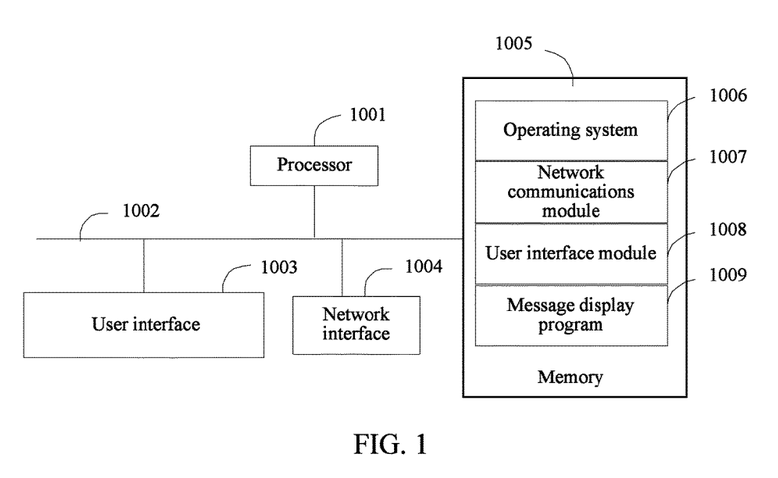
FIG. 1 is a schematic structural diagram of hardware of a terminal device according to an embodiment of this application.

FIG. 1 is a schematic structural diagram of hardware of a terminal device according to an embodiment of this application.

Referring to FIG. 1, the terminal device may include: a processor 1001 (such as a CPU), a network interface 1004, a user interface 1003, a memory 1005, and a communications bus 1002. The communications bus 1002 is configured to implement connection and communication between components in the terminal device. The user interface 1003 may include components such as a display, a keyboard, and a mouse, and is configured to receive information entered by a user, and send the received information to the processor 1001 for processing. The display may be an LCD display, an LED display, or may be a touchscreen, and is configured to display data that an open platform needs to display. Optionally, the user interface 1003 may further include a standard wired interface and wireless interface. Optionally, the network interface 1004 may include a standard wired interface and wireless interface (such as a Wi-Fi interface). The memory 1005 may be a high-speed RAM memory, or may be a non-volatile memory such as a magnetic disk storage. Optionally, the memory 1005 may further be a storage apparatus that is independent of the processor 1001. As shown in FIG. 1, as a computer storage medium, the memory 1005 may include an operating system 1006, a network communications module 1007, a user interface module 1008, and a message display program 1009.

In the terminal device shown in FIG. 1, the network interface 1004 is mainly configured to receive data that is transparently transmitted by the user interface 1003, perform legitimacy authentication on the data, to provide a unique identifier accessing a social platform such as the WeChat, the QQ, the RenRen, and the microblog for a user, and receive message sources published by friends on the social platform. The message sources maybe a social contact of a user, a social group of a user, or a public account in a social platform. Even the message sources maybe a time bar or other forms. On a social networking platform, relationships between different users can be formed by mutual agreements of the users involved. When two users agree to form a social networking relationship with each other, they become social network contacts of each other. A group of users may opt to form a social networking relationship with one another, and thus forming a social networking group. Each member of the group is a social network contact of every other member of the group. The public account may be a public social network identity established by a user or organization such as a company, official government, which provide information, media or public service to users who follow the public account with interest and allows the public to communicate with it on the social networking platform without a mutual agreement exchange. The processor 1001 is configured to analyze states of the message source, obtain read messages and unread messages by means of classification, store the read messages into a read status bar, and store the unread messages into an unread status bar, so as to display the unread messages when receiving a message source refresh request. The message source refresh request, as used herein, may also be referred as message source refresh command. The message source refresh request may be triggered, for example, when the message display program 1009 is open. The processor 1001 may be configured to invoke a message display program stored in the memory 1005, and perform the following operations: obtaining message sources published on a social platform; classifying the message sources into read messages and unread messages according to states of the message sources; providing a user interface associated with the social platform, the user interface including a first tab and a second tab for indicating the states of the message sources; respectively associating the unread messages with the first tab, and the read messages with the second tab; and receiving a message source refresh request from the user interface; in response to the message source refresh request, displaying the unread messages under the first tab of the user interface.

Further, in an embodiment, the processor 1001 invokes the message display program stored in the memory 1005, and may further perform the following operations: sorting display priorities of target messages according to importance of the target messages; and displaying the target messages according to the sorted display priorities. In some embodiments, a target message is a message source published by a friend that the user pays more attention to or pays special attention to on the social platform. The target message may alternatively be subject content in which the user is more interested, such as financial, a foreign language, management, literature, a topic, or a star; or may be a message that is newly published by a friend followed by the user. Further, priorities of target messages can be sorted based on publishers of the target messages and/or publish time. In one example, a target message may have higher priority if its publish time is more recent (e.g., having a higher time score). In another example, a target message may have higher priority if the publisher of the target message is more intimate with the user (e.g., having a higher intimacy value).

Further, in an embodiment, the processor 1001 invokes the message display program stored in the memory 1005, and may further perform the following operations: extracting the target messages from the unread messages; and sorting the display priorities of target messages based on publishers and publication times of the target messages. Specifically, sorting the target messages may further include: determining intimacy values according to relationships between the publishers of the target messages and a user; determining time scores of the target messages; obtaining overall scores of the target messages, wherein an overall score of a target message is obtained by subtracting a time score of the target message from an intimacy value associated with a publisher of the target message; sorting the display priorities of the target messages based on the overall scores.

Further, in an embodiment, the processor 1001 invokes the message display program stored in the memory 1005, and may further perform the following operations: when at least two of the target messages have a same overall score, sorting the display priorities of the at least two of the target messages according to differences between a current time and publication times of the at least two of the target messages.

Further, in an embodiment, the processor 1001 invokes the message display program stored in the memory 1005, and may further perform the following operations: obtaining a number of likes, a number of comments, a number of times that a home page or message history (historical messages/posts) is viewed, and a number of clicks to view an image in full size in the message source between the publisher and the user; determining intimacy scores of the publisher corresponding to the number of likes, the number of comments, the number of times that the home page is viewed, and the number of clicks to view the image in the message source respectively; and obtaining the intimacy value between the publisher and the user by aggregating the intimacy scores. Further, determining the time scores of the target messages may include: dividing publication times of the target messages into a preset number of time intervals (i.e., dividing the target messages into a pre-set number of groups based on the publication times, each group having a corresponding time interval), and collecting statistics on a number of times that the time interval occurs; and for each target message, obtaining a time score of the target message based on a time interval to which the publication time of the target message belongs.

Based on the foregoing hardware architecture, an embodiment of a message display method of this application is provided.

Figure 2:
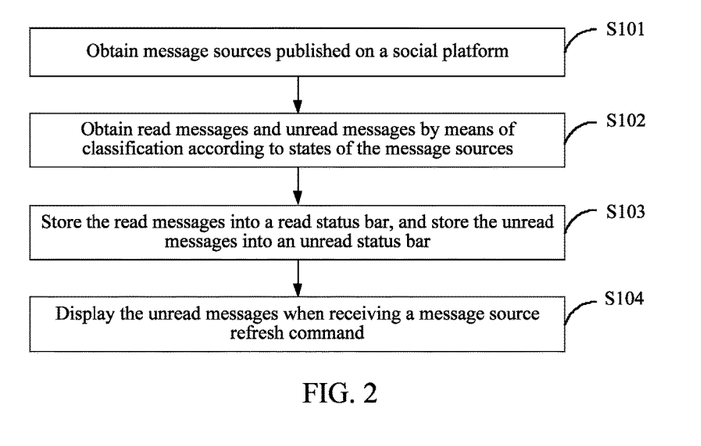
FIG. 2 is a schematic flowchart of a message display method according to an embodiment of this application.

FIG. 2 is a schematic flowchart of a message display method according to an embodiment of this application. Referring to FIG. 2, the message display method includes the following steps:

Step S101: Obtain message sources published on a social platform.

Step S102: Obtain read messages and unread messages by means of classification according to states of the message sources. In other words, the message sources can be classified into read messages and unread messages according to states of the message sources.

Step S103: Store the read messages into a read status bar, and store the unread messages into an unread status bar. Specifically, an application associated with the social platform provides a user interface for presenting messages. The user interface may support a multi-tab view. In some embodiments, the unread messages are associated with a first tab (e.g., unread status bar), and the read messages are associated with a second tab (e.g., read status bar).

Step S104: Display the unread messages when receiving a message source refresh request. In other words, in response to the message source refresh request, when the first tab is selected (e.g., by default), the user interface presents messages associated with the first tab. In the meantime, messages associated with a second tab are not presented in the user interface.

The social platform have the read status bar and the unread status bar that are used to mark the states of the message sources.

To sum up, according to the message display method provided in this embodiment of this application, message sources published on a social platform are obtained first, then read messages and unread messages are obtained by means of classification according to states of the message sources, further the read messages are stored into a read status bar, and the unread messages are stored into an unread status bar, and finally, the unread messages are displayed when a message source refresh request is received, the social platform having the read status bar and the unread status bar that are used to mark the states of the message sources. Therefore, when a user refreshes the message sources on the social platform within a period, displayed content may be prevented from being displayed on the social platform again, so that unnecessary user operations and traffic consumption are reduced, and the user may quickly find content in which the user is interested, thereby improving user experience.

Figure 3:
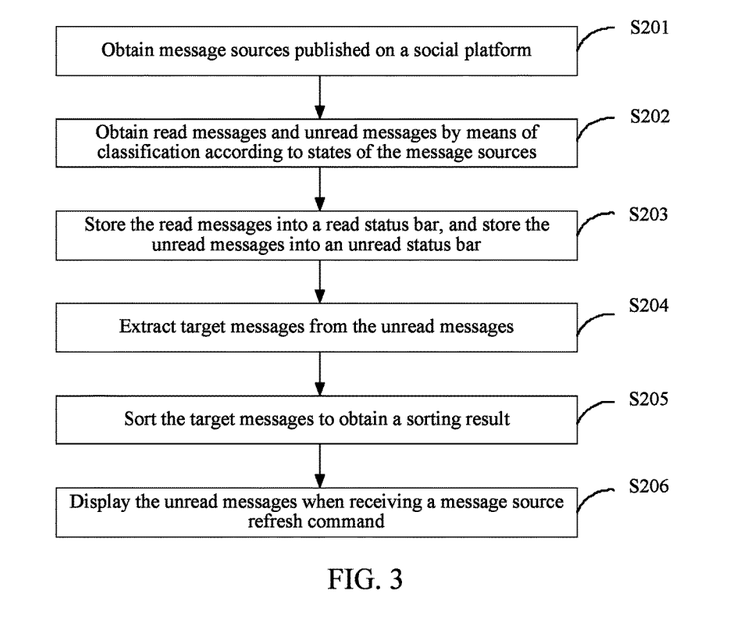
FIG. 3 is a schematic flowchart of a message display method according to an embodiment of this application.

FIG. 3 is a schematic flowchart of a message display method according to an embodiment of this application.

As shown in FIG. 3, the message display method in this embodiment of this application includes the following steps:

Step S201: Obtain message sources published on a social platform.

In this embodiment of this application, a terminal device obtains a message source published by a friend (such as a science and technology star, an entertainment star, a grass-root star, or a personal friend) followed by a user on a social platform such as the RenRen, the Qzone, the microblog, and a friend circle of the WeChat. Content of the message source may include information such as a text, a letter, a digit, an emoticon, an image, and a small video. For details, the content may be properly selected according to an actual requirement. In addition, the terminal device may be a mobile terminal such as a mobile phone, a tablet computer, or a notebook computer; or may be a fixed terminal such as a desktop computer. The social platform may be understood as the terminal device, or may be an application integrated into the terminal device. For example, the terminal device is a smartphone, and the social platform is a RenRen application. The RenRen application may be installed on the desktop of a smartphone by downloading the RenRen application from a system store corresponding to the smartphone, for example, an App Store.

It may be understood that when a friend followed by the user publishes a message on the social platform, the user may obtain a message source published by the friend by logging in to the social platform or directly refreshing the social platform.

Step S202: Obtain read messages and unread messages by means of classification according to states of the message sources. In other words, the message sources are classified into read messages and unread messages according to states of the message sources.

In this embodiment of this application, the terminal device may correspondingly mark a state of the message source as the read message according to the state of the message source, for example, when receiving a command that is triggered to open the message source. Certainly, the state of the message source may alternatively be correspondingly marked as the read message according to that the user triggers the command to open the message source and a specific time that the user stays for the message. For example, when the user obtains specific content of the message source, for example, information such as a number of words, an image size, or a video size by triggering the command to open the message source in a manner such as finger clicking, sliding downward, or by using a voice command, a preset time for reading the message source is obtained by means of calculation. In this case, a timer is started and the terminal device calculates a display time of the message. If the display time is less than or equal to 2 s, it may be determined that the state of the message is unread. This case corresponds to a case in which the user does not really read the message source when a fault such as crash occurs on the terminal device or the social platform, and the user wants to read the message source at a next login or refresh. If the display time is greater than 2 s and less than 70% of the preset time, it may be determined that the state of the message is read. This case corresponds to a case in which the user reads partial content, but is not interested in the message and does not want to read the message anymore. If the display time is greater than 70% of the preset time, it may be determined that the state of the message is read.

In some embodiments, the application constantly monitors and changes the read/unread status of a message accordingly. For example, when the user interface presents unread messages under the first tab, when the user view the first tab and scrolls down to read the messages, the application can accordingly change a message from unread state to read state based on the display time. When the user scroll back up, a message that has been marked as read message is no longer displayed under the first tab. In one example, whenever a message is displayed and display time is longer than the preset time duration, once the message is out of current focus (e.g., due to scrolling down, scrolling up, or other user actions that changes currently displayed content), the message is no longer associated with the first tab (unread status bar), and becomes associated with the second tab (read status bar). In another example, the application does not immediately switch association of the message from the first tab to the second tab. Instead, the switch happens after certain time period (e.g., 5 minutes) has passed since determining the display time of the message is longer than the preset time duration. In this way, the user can scroll back up to view a recent message without switching to the second tab to find the message. In some embodiments, the application can switch association for message sources from first tab to second tab periodically (e.g., every 15 minutes), in response to the message source refresh request, or when the application is opened.

Step S203: Store the read messages into a read status bar, and store the unread messages into an unread status bar. In other words, a user interface associated with the social platform is provided, the user interface including a first tab and a second tab for indicating the states of the message sources. Further, the unread messages are associated with the first tab, and the read messages are associated with the second tab, respectively. Further, in response to a message source refresh request from the user interface, the unread messages under the first tab of the user interface can be displayed.

Figure 4:
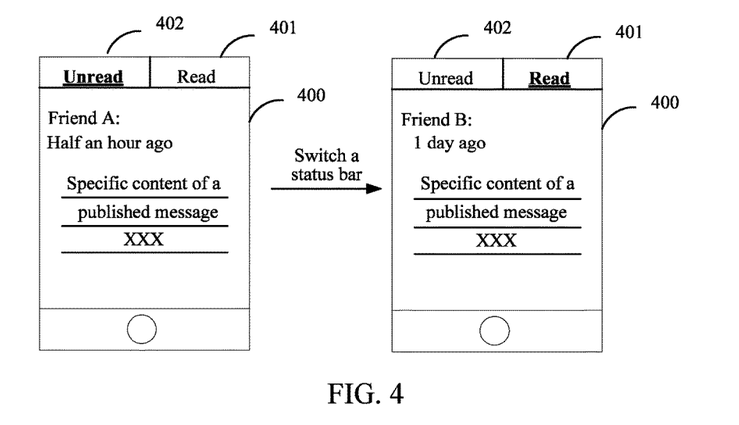
FIG. 4 is a schematic diagram of a display interface of a terminal device according to an embodiment of this application.

FIG. 4 is a schematic diagram of a display interface of a terminal device according to an embodiment of this application.

According to this embodiment of this application and with reference to FIG. 4, a user interface 400 of the social platform has the read status bar 401 and the unread status bar 402 that are used to mark the states of the message sources. The read status bar 401 is used to associate/store the read messages, and the unread status bar 402 is used to associate/store the unread messages. It may be understood that the read status bar 401 and the unread status bar 402 may be displayed for the user on the top or at another location of the user interface 400 on the social platform, so that the user may view read information and unread information at anytime. As shown in the figures, two tabs are shown in the user interface. When the left tab is highlighted/selected, unread messages are shown in the user interface. When the right tab is selected (switching the status bar), read messages are shown in the user interface. Certainly, in another embodiment, the read status bar and the unread status bar may not be displayed on the user interface 400 of the social platform, but a unread message is preferentially displayed according to an actual situation. When the user wants to view a read message, the user may perform a relevant setting to invoke the read message.

Step S204: Extract target messages from the unread messages.

In this embodiment of this application, the target message is a message source published by a friend that the user pays more attention to or pays special attention to on the social platform. Certainly, in another embodiment, the target message may alternatively be subject content in which the user is more interested, such as financial, a foreign language, management, literature, a topic, or a star; or may be a message that is newly published by a friend followed by the user. Specifically, the target message may be properly selected and set according to an actual situation, and is not limited in the examples in this embodiment of this application.

Step S205: Sort display priorities of the target messages to obtain a sorting result. In some embodiments, display priorities of target messages are sorted according to importance of the target messages. Specifically, the target messages can be sorted based on publishers of the target messages and publication times of the target messages.

In this embodiment of this application, the target messages may be sorted according to intimacy values between the user and friends in descending order; or may be sorted according to interest levels of the user for subject content in which the user is interested in descending order; or may be sorted according to time values when all friends followed by the user publish message sources in descending order, or the like. A greater time value indicates a more recently publication time of the message source. Certainly, in another embodiment, the target messages may be sorted according to two dimensions the intimacy values and the time values, or may be sorted according to two dimensions the intimacy values and the interest levels, or may be sorted according to three dimensions the intimacy value, the time values, and the interest levels.

Step S206: Display the unread messages when receiving a message source refresh request.

In this embodiment of this application, when receiving the message source refresh request, the terminal device may display the unread messages according to the sorting result (i.e. display priorities of the target messages) such as the intimacy values or the interest levels or the time values, or a combination of any two of the three values, or a combination of the three values.

It should be additionally noted that the foregoing step S204 and step S205 are optional steps. That is, when the read messages are stored into the read status bar and the unread messages are stored into the unread status bar, the unread messages may be displayed when the message source refresh request is received without performing step S204 and step S205.

To sum up, according to the message display method provided in this embodiment of this application, message sources published on a social platform are obtained first, then read messages and unread messages are obtained by means of classification according to states of the message sources, further the read messages are stored into a read status bar, and the unread messages are stored into an unread status bar, and finally, the unread messages are displayed when a message source refresh request is received, the social platform having the read status bar and the unread status bar that are used to mark the states of the message sources. Therefore, when a user refreshes the message sources on the social platform within a period, displayed content may be prevented from being displayed on the social platform again, so that unnecessary user operations and traffic consumption are reduced, and the user may quickly find content in which the user is interested, thereby improving user experience.

The user easily misses a message published by a friend followed by the user on the social platform. For example, a friend followed by the user publishes a message on Tuesday, but because the user is busy on Tuesday and Wednesday and does not log in to the social platform or refreshes the message sources, the user may miss the message. According to the message display method provided in this embodiment of this application, messages may be sorted according to intimacy values, so as to prevent the user from missing a message published by a friend that the user pays special attention to.

Figure 5:
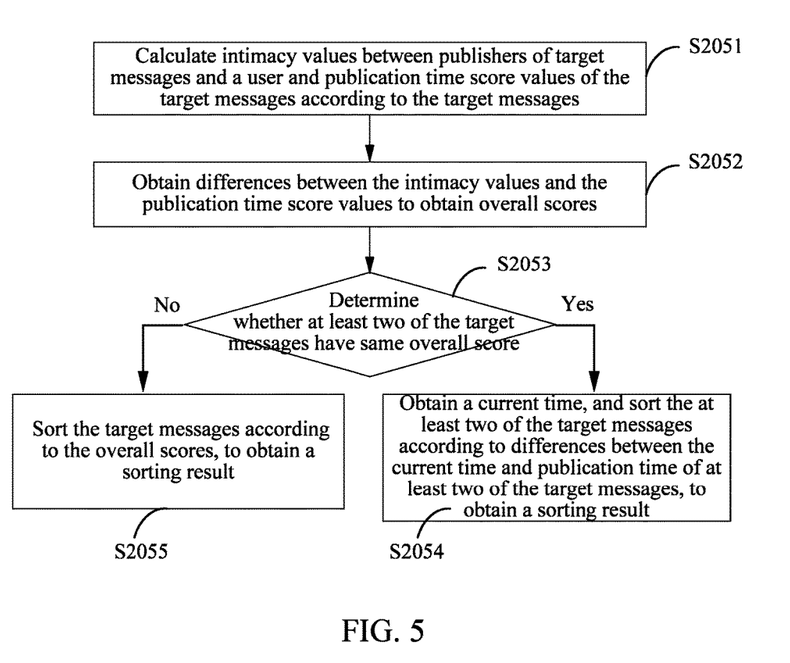
FIG. 5 is a detailed schematic flowchart of a step of sorting target messages to obtain a sorting result in FIG. 3.

FIG. 5 is a detailed schematic flowchart of a step of the sorting the target messages to obtain a sorting result in FIG. 3.

In this embodiment of this application, as shown in FIG. 5, based on the embodiment in FIG. 3, step S205 includes:

S2051: Calculate/determine intimacy values between publishers of the target messages and a user and time scores of the target messages according to the target messages.

In this embodiment of this application, if the target messages are message sources published by friends that the user pays more attention to or pays special attention to, the terminal device invokes messages of the user and all friends followed by the user, and calculates the intimacy values and the time scores of the current target messages. The intimacy value may be obtained by means of converting and calculating a number of likes, a number of comments, a number of times that a home page is viewed, and a number of clicks to view an image in full size in the message source.

S2052: Obtain differences between the intimacy values and the time scores. In other words, overall scores of the target messages can be obtained factoring in both the time score and the intimacy value. For example, the overall score of a target message is obtained by subtracting a time score of the target message from an intimacy value associated with a publisher of the target message.

In this embodiment of this application, assuming that a calculated intimacy value between the user and a first friend is a score of 10 and a time score is a score of 5, the overall score (e.g., a difference obtained by means of calculation) is a score of 5. Assuming that a calculated intimacy value between the user and a second friend is a score of 9 and a time score is a score of 6, the overall score is a score of 3. Assuming that a calculated intimacy value between the user and a third friend is a score of 10 and a time score is a score of 2, the overall score is a score of 8. Assuming that a calculated intimacy value between the user and a fourth friend is a score of 8 and a time score is a score of 8, the overall score is a score of 0. After the overall scores of the target messages are obtained, the target messages can be sorted based on the overall scores. For example, a target message having a higher overall score is sorted at a higher rank, and will be displayed under the first tab in a more front position.

S2053: Determine whether at least two of the target messages have a same overall score.

When target messages have different overall scores, their ranks in the sorting result are definite. When two or more target messages have a same overall score, their rank in the sorting result need to be further determined.

S2054: When at least two of the target messages have a same overall score, sort the at least two of the target messages according to differences between a current time and publication time of the target messages, to obtain the sorting result. In some embodiments, when at least two target messages have a same overall score, the one with a later publication time has a higher display priority.

In this embodiment of this application, when the intimacy value between the user and the fourth friend is the score of 8 and the time score of a first target message is the score of 8, the overall score of the first target message is the score of 0. If the overall score of a second target message published by a fifth friend is also 0, the ranks of the first target message and the second target message in the sorting results need to be determined. In this case, the terminal device obtains a current time and publication time of the first and second target messages of the friends followed by the user, calculates difference between the current time and the publication time of the target messages of the friends followed by the user, and finally sorts the target messages in an order of the differences. For example, the first target message may have a later publication time than the second target message. Accordingly, the first target message may be sorted in front of the second target message.

S2055: If not, sort the target messages according to the differences, to obtain the sorting result. In other words, when target messages have different overall scores, their ranks in the sorting result are obtained based on the overall scores.

In this embodiment of this application, when the intimacy value between the user and the first friend is the score of 10 and the time score is the score of 5, the difference obtained by means of calculation is the score of 5. When the intimacy value between the user and the second friend is the score of 9 and the time score is the score of 6, the difference obtained by means of calculation is the score of 3. When the intimacy value between the user and the third friend is the score of 10 and the time score is the score of 2, the difference obtained by means of calculation is the score of 8. In this case, the terminal device sorts the target messages according to two dimensions the intimacy values and the time scores. Because the score of 8 is greater than the score of 5 and is greater than the score of 3, the finally obtained sorting result is that the message published by the third friend ranks the first, the message published by the first friend ranks the second, and the message published by the second friend ranks the third. Certainly, in an actual application, a number of friends that the user actually follows may be specifically analyzed, and is not limited to the four friends listed in this embodiment of this application.

Figure 6:
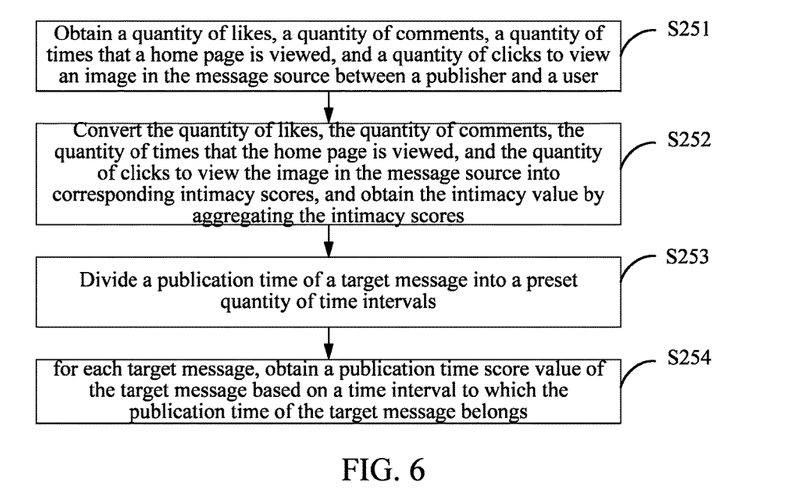
FIG. 6 is a detailed schematic flowchart of a step of calculating intimacy values between publishers of target messages and a user and time scores of the target messages according to the target messages in FIG. 5.

FIG. 6 is a detailed schematic flowchart of a step of the calculating intimacy values between publishers of the target messages and a user and time scores of the target messages according to the target messages in FIG. 5.

In an optional embodiment, referring to FIG. 6, step S2051 may further include:

S251: Obtain a number of likes, a number of comments, a number of times that a home page is viewed, and a number of clicks to view an image in full size in the message source between the publisher and the user.

In this embodiment of this application, an intimate relationship may be reflected in an interaction status between the publisher, that is, the friend followed by the user, and the user, for example, a number of likes, a number of comments, a number of times that a home page is viewed, and a number of clicks to view an image in full size in the message source between the publisher and the user. Certainly, the intimate relationship may be reflected in a number of comments, a number of times that a home page is viewed, and a number of clicks to view an image in full size in the message source of the user for the friend followed by the user. It may be understood that in another embodiment, the intimate relationship may further be reflected in combination with a number of reposts.

S252: Convert the number of likes, the number of comments, the number of times that the home page is viewed, and the number of clicks to view the image in the message source into intimacy scores respectively. The intimacy value between the publisher and the user can be obtained by aggregating the intimacy scores.

In this embodiment of this application, an algorithm of converting the number of likes, the number of comments, the number of times that the home page is viewed, and the number of clicks to view the image in the message source into a corresponding intimacy value may be as follows:

A score of 1 is added for each like, a score of 2 is added for each comment, a score of 3 is added for each time the home page is viewed, and a score of 1 is added for each time the image in the message source is clicked. Assuming that the number of likes, the number of comments, the number of times that the home page is viewed, and the number of clicks to view the image in the message source that are collected by the terminal device are respectively A, B, C, and D, the intimacy value is $A+2B+3C+D$.

In another embodiment, assuming that a score of 2 is added for each repost and a number of reposts is E, the intimacy value is A+2B+3C+D+2E. It may be understood that score settings of the parameters may be properly set according to an actual situation, and are not limited in this embodiment of this application.

S253: Divide a publication time of the target message into a preset number of time intervals In some embodiments, statistics on a number of times that the time interval occurs may be collected.

S254: For each target message, obtain a time score of the target message based on a time interval to which the publication time of the target message belongs.

In this embodiment of this application, the publication time of the target message is divided into four time intervals, and statistics on a number of times that the time interval occurs is collected. A corresponding time score is converted as follows in detail:

when a first time interval<12 hours, a score of 0 is marked;

when 12 hours≤a second time interval<24 hours, a score of 1 is marked;

when 24 hours≤a third time interval<36 hours, a score of 2 is marked; and when 36 hours≤a fourth time interval<48 hours, a score of 3 is marked.

In some embodiments, the time score of a target message is obtained based on a time interval to which the publication time of the target message belongs. For example, when the publication time of the target message is less than 12 hours old (i.e., belongs to the first time interval), its publication time score is 0; when the publication time of a target message belongs to the third time interval, its publication time score is 2.

In some embodiments, the number of times that the time interval occurs may be converted into a corresponding time score. Assuming that a number of times that the first time interval occurs, a number of times that the second time interval occurs, a number of times that the third time interval occurs, and a number of times that the fourth time interval occurs that are collected by the terminal device are respectively M, N, 0, and P, the time score is N+2O+3P.

In this case, in an embodiment, a different between the intimacy value and the time score is:

(A+2B+3C+D)−(N+2O+3P).

Based on the foregoing hardware structure, a functional module embodiment of a terminal device of this application is provided.

Figure 7:
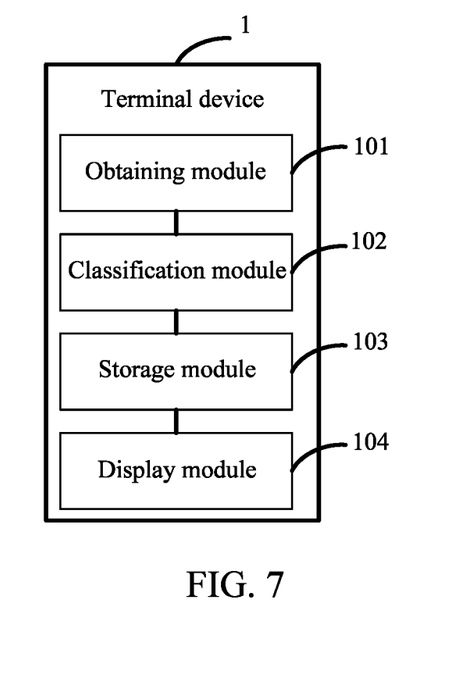
FIG. 7 is a schematic functional module diagram of a terminal device according to an embodiment of this application.

FIG. 7 is a schematic functional module diagram of a terminal device according to an embodiment of this application.

Referring to FIG. 7, the terminal device 1 includes: an obtaining module 101, configured to obtain message sources published on a social platform; a classification module 102, configured to obtain read messages and unread messages by means of classification according to states of the message sources; a storage module 103, configured to store the read messages into a read status bar, and store the unread messages into an unread status bar; and a display module 104, configured to display the unread messages when receiving a message source refresh request, the social platform having the read status bar and the unread status bar that are used to mark the states of the message sources. These program modules may be stored in a memory of the terminal device 1 and to be executed by a processor of the terminal device 1.

To sum up, according to the terminal device 1 provided in this embodiment of this application, message sources published on a social platform are obtained first, then the message sources are classified into read messages and unread messages are according to states of the message sources, further the read messages are associated with a read status bar (a second tab in a user interface), and the unread messages are associated with an unread status bar (a first tab in the user interface), and finally, the unread messages are displayed when a message source refresh request is received, the social platform having the read status bar and the unread status bar that are used to mark the states of the message sources. Therefore, when a user refreshes the message sources on the social platform within a period, displayed content may be prevented from being displayed on the social platform again, so that unnecessary user operations and traffic consumption are reduced, and the user may quickly find content in which the user is interested, thereby improving user experience.

Figure 8:
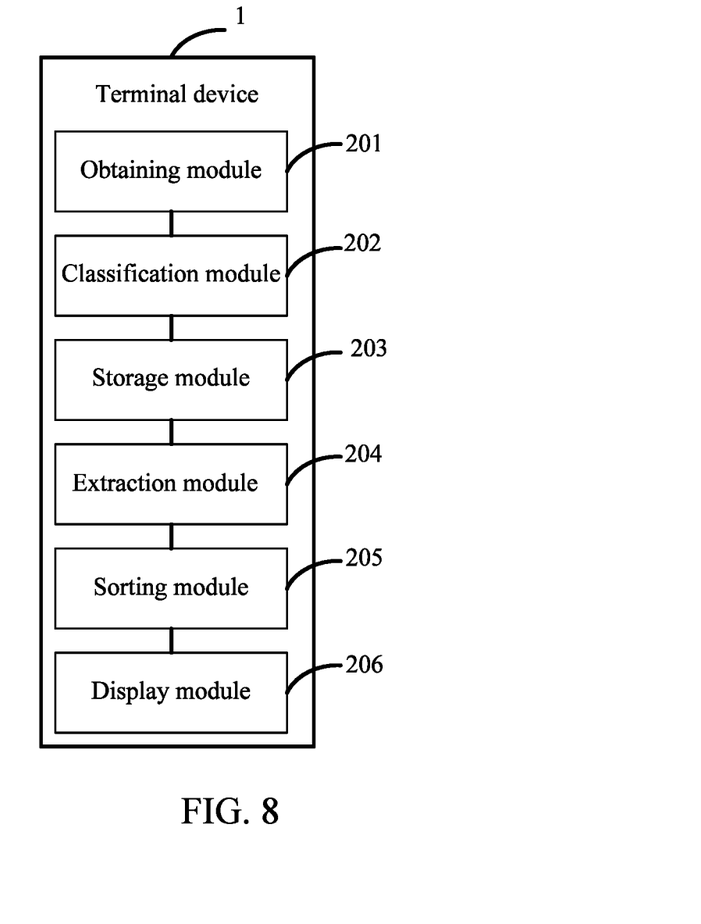
FIG. 8 is a schematic functional module diagram of a terminal device according to an embodiment of this application.

FIG. 8 is a schematic functional module diagram of a terminal device according to an embodiment of this application.

As shown in FIG. 8, a terminal device 1 provided in this embodiment of this application includes: an obtaining module 201, an classification module 202, a storage module 203, an extraction module 204, a sorting module 205, and a display module 206. These program modules may be stored in a memory of the terminal device 1 and to be executed by a processor of the terminal device 1.

The obtaining module 201 is configured to obtain message sources published on a social platform.

In this embodiment of this application, the terminal device 1 obtains a message source published by a friend (such as a science and technology star, an entertainment star, a grass-root star, or a personal friend) followed by a user on a social platform such as the RenRen, the Qzone, the microblog, and a friend circle of the WeChat. Content of the message source may include information such as a text, a letter, a digit, an emoticon, an image, and a small video. For details, the content may be properly selected according to an actual requirement. In addition, the terminal device 1 may be a mobile terminal such as a mobile phone, a tablet computer, or a notebook computer; or may be a fixed terminal such as a desktop computer. The social platform may be understood as the terminal device 1, or may be an application integrated into the terminal device 1. For example, the terminal device 1 is a smartphone, and the social platform is a RenRen application. The RenRen application may be installed on the desktop of a smartphone by downloading the RenRen application from a system store corresponding to the smartphone, for example, an App Store.

It may be understood that when a friend followed by the user publishes a message on the social platform, the user may obtain a message source published by the friend by logging in to the social platform or directly refreshing the social platform.

The classification module 202 is configured to obtain read messages and unread messages by means of classification according to states of the message sources.

In this embodiment of this application, the terminal device 1 may correspondingly mark a state of the message source as the read message according to the state of the message source, for example, when receiving a command that is triggered to open the message source. Certainly, the state of the message source may alternatively be correspondingly marked as the read message according to that the user triggers the command to open the message source and a specific time that the user stays for the message. Specifically, when the user obtains specific content of the message source, for example, information such as a number of words, an image size, or a video size by triggering the command to open the message source in a manner such as finger clicking, sliding downward, or by using a voice command, a preset time for reading the message source is obtained by means of calculation. In this case, a timer is started and the terminal device 1 calculates a display time of the message. If the display time is less than or equal to 2 s, it may be determined that the state of the message is unread. This case corresponds to a case in which the user does not really read the message source when a fault such as crash occurs on the terminal device 1 or the social platform, and the user wants to read the message source at a next login or refresh. If the display time is greater than 2 s and less than 70% of the preset time, it may be determined that the state of the message is read. This case corresponds to a case in which the user reads partial content, but is not interested in the message and does not want to read the message anymore. If the display time is greater than 70% of the preset time, it may be determined that the state of the message is read.

The storage module 203 is configured to store the read messages into a read status bar, and store the unread messages into an unread status bar.

In this embodiment of this application, referring to FIG. 4, the social platform has the read status bar and the unread status bar that are used to mark the states of the message sources. The read status bar is used to store the read messages, and the unread status bar is used to store the unread messages. It may be understood that the read status bar and the unread status bar may be displayed for the user on the top or at another location of the social platform, so that the user may view read information and unread information at anytime. Certainly, in another embodiment, the read status bar and the unread status bar may not be displayed on the social platform, but a unread messages is preferentially displayed according to an actual situation. When the user wants to view a read message, the user may perform a relevant setting to invoke the read message.

The extraction module 204 is configured to extract target messages from the unread messages.

In this embodiment of this application, the target message is a message source published by a friend that the user pays more attention to or pays special attention to on the social platform. Certainly, in another embodiment, the target message may alternatively be subject content in which the user is more interested, such as financial, a foreign language, management, literature, a topic, or a star; or may be a message that is newly published by a friend followed by the user. Specifically, the target message may be properly selected and set according to an actual situation, and is not limited in the examples in this embodiment of this application.

The sorting module 205 is configured to sort the target messages to obtain a sorting result.

In this embodiment of this application, the target messages may be sorted according to intimacy values between the user and friends in descending order; or may be sorted according to interest levels of the user for subject content in which the user is interested in descending order; or may be sorted according to time values when all friends followed by the user publish message sources in descending order, or the like. Certainly, in another embodiment, the target messages may be sorted according to two dimensions the intimacy values and the time values, or may be sorted according to two dimensions the intimacy values and the interest levels, or may be sorted according to three dimensions the intimacy value, the time values, and the interest levels.

The display module 206 is configured to display the unread messages when receiving a message source refresh request.

In this embodiment of this application, when receiving the message source refresh request, the terminal device 1 may display the unread messages according to the sorting result such as the intimacy values or the interest levels or the time values, or a combination of any two of the three values, or a combination of the three values.

It should be additionally noted that the foregoing extraction module 204 and the sorting module 205 are optional modules. That is, when the terminal device 1 stores the read messages into the read status bar and stores the unread messages into the unread status bar, the terminal device 1 may directly display the unread messages when receiving the message source refresh request without requiring processing of the extraction module 204 and the sorting module 205.

To sum up, according to the terminal device 1 provided in this embodiment of this application, message sources published on a social platform are obtained first, then read messages and unread messages are obtained by means of classification according to states of the message sources, further the read messages are stored into a read status bar, and the unread messages are stored into an unread status bar, and finally, the unread messages are displayed when a message source refresh request is received, the social platform having the read status bar and the unread status bar that are used to mark the states of the message sources. Therefore, when a user refreshes the message sources of the social platform within a period, displayed content may be prevented from being displayed on the social platform again, so that unnecessary user operations and traffic consumption are reduced, and the user may quickly find content in which the user is interested, thereby improving user experience.

The user easily misses a message published by a friend followed by the user on the social platform. For example, a friend followed by the user publishes a message on Tuesday, but because the user is busy on Tuesday and Wednesday and does not log in to the social platform or refreshes the message sources, the user may miss the message. According to the terminal device 1 provided in this embodiment of this application, messages may be sorted according to intimacy values, so as to prevent the user from missing a message published by a friend that the user pays special attention to.

Figure 9:
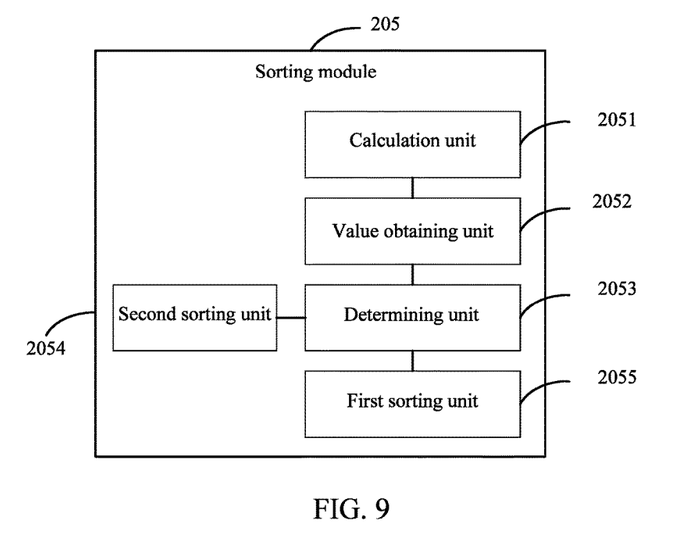
FIG. 9 is a detailed schematic functional module diagram of a sorting module in FIG. 8.

FIG. 9 is a detailed schematic functional module diagram of the sorting module in FIG. 8.

In this embodiment of this application, as shown in FIG. 9, based on the embodiment in FIG. 8, the sorting module 205 includes: a calculation unit 2051, a value obtaining unit 2052, a determining unit 2053, a second sorting unit 2054, and a first sorting unit 2055.

The calculation unit 2051 is configured to calculate intimacy values between publishers of the target messages and a user and time scores of the target messages according to the target messages.

In this embodiment of this application, if the target messages are message sources published by friends that the user pays more attention to or pays special attention to, the terminal device 1 invokes messages of the user and all friends followed by the user, and calculates the intimacy values and the time scores of the current target messages. The intimacy value may be obtained by means of converting and calculating a number of likes, a number of comments, a number of times that a home page is viewed, and a number of clicks to view an image in full size in the message source.

The value obtaining unit 2052 is configured to obtain differences between the intimacy values and the time scores. An overall score of the target message is the difference between an intimacy value of the publisher of the target message and the time score of the target message.

In this embodiment of this application, assuming that a calculated intimacy value between the user and a first friend is a score of 10 and a time score is a score of 5, a difference obtained by means of calculation is a score of 5. Assuming that a calculated intimacy value between the user and a second friend is a score of 9 and a time score is a score of 6, a difference obtained by means of calculation is a score of 3. Assuming that a calculated intimacy value between the user and a third friend is a score of 10 and a time score is a score of 2, a difference obtained by means of calculation is a score of 8. Assuming that a calculated intimacy value between the user and a fourth friend is a score of 8 and a time score is a score of 8, a difference obtained by means of calculation is a score of 0.

The determining unit 2053 is configured to determine whether at least two of the target messages have a same overall score.

When target messages have different overall scores, their ranks in the sorting result are definite. When two or more target messages have a same overall score, their rank in the sorting result need to be further determined.

The second sorting unit 2054 is configured to: When at least two of the target messages have a same overall score, obtain a current time, and sort the at least two of the target messages according to differences between the current time and publication time of the target messages, to obtain the sorting result.

In this embodiment of this application, when the intimacy value between the user and the fourth friend is the score of 8 and the time score of a first target message is the score of 8, the overall score of the first target message is the score of 0. If the overall score of a second target message published by a fifth friend is also 0, the ranks of the first target message and the second target message in the sorting results need to be determined. In this case, the terminal device obtains a current time and publication time of the first and second target messages of the friends followed by the user, calculates difference between the current time and the publication time of the target messages of the friends followed by the user, and finally sorts the target messages in an order of the differences. For example, the first target message may have a later publication time than the second target message. Accordingly, the first target message may be sorted in front of the second target message.

The first sorting unit 2055 is configured to: if not, sort the target messages according to the differences, to obtain the sorting result. In other words, when target messages have different overall scores, their ranks in the sorting result are obtained based on the overall scores.

In this embodiment of this application, when the intimacy value between the user and the first friend is the score of 10 and the time score is the score of 5, the difference obtained by means of calculation is the score of 5. When the intimacy value between the user and the second friend is the score of 9 and the time score is the score of 6, the difference obtained by means of calculation is the score of 3. When the intimacy value between the user and the third friend is the score of 10 and the time score is the score of 2, the difference obtained by means of calculation is the score of 8. In this case, the terminal device 1 sorts the target messages according to two dimensions the intimacy values and the time scores. Because the score of 8 is greater than the score of 5 and is greater than the score of 3, the finally obtained sorting result is that the message published by the third friend ranks the first, the message published by the first friend ranks the second, and the message published by the second friend ranks the third. Certainly, in an actual application, a number of friends that the user actually follows may be specifically analyzed, and is not limited to the four friends listed in this embodiment of this application.

Figure 10:
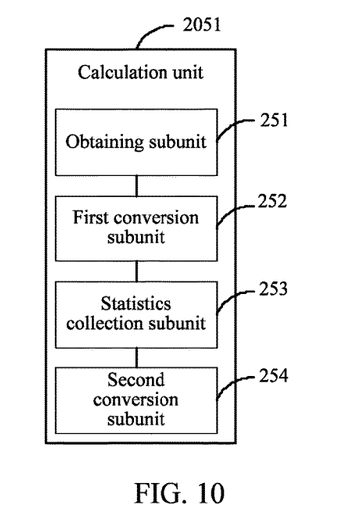
FIG. 10 is a detailed schematic functional module diagram of a calculation unit in FIG. 9.

FIG. 10 is a detailed schematic functional module diagram of the calculation unit in FIG. 9.

Referring to FIG. 10, the calculation unit 2051 includes an obtaining subunit 251, a first conversion subunit 252, a statistic collection subunit 253, and a second conversion subunit 254.

The obtaining subunit 251 is configured to obtain a number of likes, a number of comments, a number of times that a home page is viewed, and a number of clicks to view an image in full size in the message source between the publisher and the user.

In this embodiment of this application, an intimate relationship may be reflected in an interaction status between the publisher, that is, the friend followed by the user, and the user, for example, a number of likes, a number of comments, a number of times that a home page is viewed, and a number of clicks to view an image in full size in the message source between the publisher and the user. Certainly, the intimate relationship may be reflected in a number of comments, a number of times that a home page is viewed, and a number of clicks to view an image in full size in the message source of the user for the friend followed by the user. It may be understood that in another embodiment, the intimate relationship may further be reflected in combination with a number of reposts.

The first conversion subunit 252 is configured to convert the number of likes, the number of comments, the number of times that the home page is viewed, and the number of clicks to view the image in the message source into intimacy scores respectively. The intimacy value between the publisher and the user can be obtained by aggregating the intimacy scores.

In this embodiment of this application, an algorithm of the converting the number of likes, the number of comments, the number of times that the home page is viewed, and the number of clicks to view the image in the message source into a corresponding intimacy value may be as follows:

A score of 1 is added for each like, a score of 2 is added for each comment, a score of 3 is added for each time the home page is viewed, and a score of 1 is added for each time the image in the message source is clicked. Assuming that the number of likes, the number of comments, the number of times that the home page is viewed, and the number of clicks to view the image in the message source that are collected by the terminal device 1 are respectively A, B, C, and D, the intimacy value is A+2B+3C+D.

In another embodiment, assuming that a score of 2 is added for each repost and a number of reposts is E, the intimacy value is A+2B+3C+D+2E. It may be understood that score settings of the parameters may be properly set according to an actual situation, and are not limited in this embodiment of this application.

The statistic collection subunit 253 is configured to: divide a publication time of the target message into a preset number of time intervals. In some embodiments, statistics on a number of times that the time interval occurs may be collected.

The second conversion subunit 254 is configured to for each target message, obtain a time score of the target message based on a time interval to which the publication time of the target message belongs.

In this embodiment of this application, the publication time of the target message is divided into four time intervals, and statistics on a number of times that the time interval occurs is collected. A corresponding time score is converted as follows in detail:

when a first time interval<12 hours, a score of 0 is marked;

when 12 hours≤a second time interval<24 hours, a score of 1 is marked;

when 24 hours≤a third time interval<36 hours, a score of 2 is marked; and when 36 hours≤a fourth time interval<48 hours, a score of 3 is marked.

In some embodiments, the time score of a target message is obtained based on a time interval to which the publication time of the target message belongs. For example, when the publication time of the target message is less than 12 hours old (i.e., belongs to the first time interval), its publication time score is 0, and the overall score equals A+2B+3C+D−0; when the publication time of a target message belongs to the third time interval, its publication time score is 2, and the overall score equals A+2B+3C+D−2.

In some embodiments, the number of times that the time interval occurs may be converted into a corresponding time score. Assuming that a number of times that the first time interval occurs, a number of times that the second time interval occurs, a number of times that the third time interval occurs, and a number of times that the fourth time interval occurs that are collected by the terminal device 1 are respectively M, N, 0, and P, the time score is N+2O+3P.

In this case, in an embodiment, a different between the intimacy value and the time score is:

(A+2B+3C+D)−(N+2O+3P).

According to the message display method and the terminal device provided in the embodiments of this application, message sources published on a social platform are obtained first, then read messages and unread messages are obtained by means of classification according to states of the message sources, further the read messages are stored into a read status bar, and the unread messages are stored into an unread status bar, and finally, the unread messages are displayed when a message source refresh request is received, the social platform having the read status bar and the unread status bar that are used to mark the states of the message sources. Therefore, when a user refreshes the message sources on the social platform within a period, displayed content may be prevented from being displayed on the social platform again, so that unnecessary user operations and traffic consumption are reduced, and the user may quickly find content in which the user is interested, thereby improving user experience.

It should be further noted that terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

Based on the foregoing descriptions of the implementation manners, a person skilled in the art may clearly understand that the foregoing embodiment methods may be implemented by software in addition to necessary universal hardware or by hardware only. In most circumstances, the former is a preferred implementation manner. Based on such an understanding, the technical solutions of this application or the part that makes contributions to the existing technology may be substantially embodied in the form of a software product. The computer software product is stored in a storage medium (for example, a ROM/RAM, a magnetic disk, or an optical disc), and contains several instructions for instructing a terminal device (which may be a mobile phone, a computer, a server, or a network device) to perform the method according to the embodiments.

The foregoing descriptions are merely embodiments of this application, and the protection scope of this application is not limited thereto. All equivalent structure or process changes made according to the content of this specification and accompanying drawings in this application or by directly or indirectly applying this application in other related technical fields shall fall within the protection scope of the present invention.

What is claimed is:

1. A message display method, comprising:
    obtaining message sources published on a social platform;
    classifying the message sources into read messages and unread messages according to states of the message sources;
    providing a user interface associated with the social platform, the user interface including a first tab and a second tab for indicating the states of the message sources;
    respectively associating the unread messages with the first tab, and the read messages with the second tab;
    extracting target messages from the unread messages;
    determining intimacy values according to relationships between publishers of the target messages and a user;
    determining time scores of the target messages according to publication times;
    obtaining overall scores of the target messages, wherein an overall score of a target message is obtained by subtracting a time score of the target message from an intimacy value associated with a publisher of the target message;
    sorting display priorities of the target messages based on the overall scores;
    receiving a message source refresh request from the user interface; and
    in response to the message source refresh request, displaying the unread messages under the first tab of the user interface, comprising: displaying the target messages according to the sorted display priorities.

2. The message display method according to claim 1, further comprising:
    when at least two of the target messages have a same overall score, sorting the display priorities of the at least two of the target messages according to differences between a current time and publication times of the at least two of the target messages.

3. The message display method according to claim 1, wherein determining the intimacy values further comprises:
for each publisher,
    obtaining a number of likes, a number of comments, a number of times that a home page or historical messages are viewed, or a number of clicks to view an image in full size in the message source between the publisher and the user;
    determining intimacy scores of the publisher corresponding to the number of likes, the number of comments, the number of times that the home page or the history message is viewed, and the number of clicks to view the image in full size in the message source respectively; and obtaining the intimacy value between the publisher and the user by aggregating the intimacy scores.

4. The message display method according to claim 1, wherein:
determining the time scores of the target messages further comprises:
dividing the publication times of the target messages into a preset number of time intervals; and
for each target message, obtaining the time score of the target message based on a time interval to which the publication time of the target message belongs.

5. A terminal device, comprising a processor and a memory coupled to the processor, the memory storing an instruction executable by the processor, and the processor being configured for:
obtaining message sources published on a social platform;
classifying the message sources into read messages and unread messages according to states of the message sources;
providing a user interface associated with the social platform, the user interface including a first tab and a second tab for indicating the states of the message sources;
respectively associating the unread messages with the first tab, and the read messages with the second tab; and
extracting target messages from the unread messages;
determining intimacy values according to relationships between publishers of the target messages and a user;
determining time scores of the target messages according to publication times;
obtaining overall scores of the target messages, wherein an overall score of a target message is obtained by subtracting a time score of the target message from an intimacy value associated with a publisher of the target message;
sorting display priorities of the target messages based on the overall scores;
receiving a message source refresh request from the user interface; and
in response to the message source refresh request, displaying the unread messages under the first tab of the user interface, comprising: displaying the target messages according to the sorted display priorities.

6. The terminal device according to claim 5, wherein the processor is further configured for:
when at least two of the target messages have a same overall score, sorting the display priorities of the at least two of the target messages according to differences between a current time and publication times of the at least two of the target messages.

7. The terminal device according to claim 5, wherein determining the intimacy values further comprises: for each publisher,
obtaining a number of likes, a number of comments, a number of times that a home page or historical messages are viewed, and a number of clicks to view an image in full size in the message source between the publisher and the user;
determining intimacy scores of the publisher corresponding to the number of likes, the number of comments, the number of times that the home page is viewed, and the number of clicks to view the image in full size in the message source respectively; and obtaining the intimacy value between the publisher and the user by aggregating the intimacy scores.

8. The terminal device according to claim 5, wherein determining the time scores of the target messages further comprises:
dividing the publication times of the target messages into a preset number of time intervals; and
for each target message, obtaining the time score of the target message based on a time interval to which the publication time of the target message belongs.

9. A non-transitory computer-readable storage medium containing computer-executable program for, when being executed by a processor, implementing a message display method, the message display method including:
obtaining message sources published on a social platform;
classifying the message sources into read messages and unread messages according to states of the message sources;
providing a user interface associated with the social platform, the user interface including a first tab and a second tab for indicating the states of the message sources;
respectively associating the unread messages with the first tab, and the read messages with the second tab;
extracting target messages from the unread messages;
determining intimacy values according to relationships between publishers of the target messages and a user;
determining time scores of the target messages according to publication times;
obtaining overall scores of the target messages, wherein an overall score of a target message is obtained by subtracting a time score of the target message from an intimacy value associated with a publisher of the target message;
sorting display priorities of the target messages based on the overall scores;
receiving a message source refresh request from the user interface; and
in response to the message source refresh request, displaying the unread messages under the first tab of the user interface, comprising: displaying the target messages according to the sorted display priorities.

10. The storage medium according to claim 9, further comprising:
when at least two of the target messages have a same overall score, sorting the display priorities of the at least two of the target messages according to differences between a current time and publication times of the at least two of the target messages.

11. The storage medium according to claim 9, wherein:
determining the intimacy values further comprises: for each publisher,
obtaining a number of likes, a number of comments, a number of times that a home page or historical messages are viewed, and a number of clicks to view an image in full size in the message source between the publisher and the user;
determining intimacy scores of the publisher corresponding to the number of likes, the number of comments, the number of times that the home page is viewed, and the number of clicks to view the image in full size in the message source respectively; and
obtaining the intimacy value between the publisher and the user by aggregating the intimacy scores.

12. The storage medium according to claim 9, wherein determining the time scores of the target messages further comprises:
- dividing the publication times of the target messages into a preset number of time intervals; and
- for each target message, obtaining the time score of the target message based on a time interval to which the publication time of the target message belongs.

* * * * *